United States Patent [19]
Anderson et al.

[11] Patent Number: 6,098,426
[45] Date of Patent: Aug. 8, 2000

[54] METHOD AND APPARATUS FOR FORMING A GLASS ARTICLE POSSESSING AN APERTURE

[75] Inventors: James G. Anderson, Dundee; Edwin Q. Giles, Beaver Dams, both of N.Y.

[73] Assignee: Corning Incorporated, Corning, N.Y.

[21] Appl. No.: 09/374,914

[22] Filed: Aug. 13, 1999

[51] Int. Cl.[7] .................................................. C03B 21/04
[52] U.S. Cl. ................. 65/166; 65/174; 65/362; 65/66; 65/97; 65/105; 65/112; 65/56; 425/292; 425/298; 425/302.1; 425/306
[58] Field of Search ............................... 65/105, 112, 56, 65/166, 174, 362, 66, 97, 87; 425/292, 298, 302.1, 306

[56] References Cited

U.S. PATENT DOCUMENTS

| | | |
|---|---|---|
| 1,229,572 | 6/1917 | Brinzweig . |
| 1,290,738 | 1/1919 | Groth . |
| 1,513,756 | 11/1924 | Hancock . |
| 1,793,603 | 2/1931 | Frederick . |
| 1,856,319 | 5/1932 | Cooper . |
| 1,972,789 | 9/1934 | Newkirk . |
| 3,193,367 | 7/1965 | Giffen ........................................ 65/70 |
| 3,484,518 | 12/1969 | Ignell . |
| 3,528,791 | 9/1970 | Giffen ........................................ 65/67 |
| 4,328,067 | 5/1982 | Cesano . |
| 4,361,419 | 11/1982 | Anderson et al. .......................... 65/67 |
| 4,605,429 | 8/1986 | Rajnik ....................................... 65/105 |
| 5,858,046 | 1/1999 | Allen et al. ................................. 65/66 |

Primary Examiner—Stanley S. Silverman
Assistant Examiner—Michael P. Colaianni
Attorney, Agent, or Firm—Anca C. Gheorghiu

[57] ABSTRACT

The present invention is directed to an apparatus and method for forming glass article from sheet glass. More specifically the apparatus comprises a mold, a plunger being cooperative alignment with the mold, wherein the mold and the plunger form a cavity exhibiting the shaped of the glass article, an outer trimmer for separating the glass article from the surrounding excess sheet glass, and an inner trimmer for forming the aperture in the glass article, and the method involves forming the aperture during the hot-forming process, therefore eliminating a post-formation step.

1 Claim, 6 Drawing Sheets

METHOD AND APPARATUS FOR FORMING A GLASS ARTICLE POSSESSING AN APERTURE

BACKGROUND OF THE INVENTION

1. Technical Field

The present invention relates generally to glass forming, and particularly to a method and apparatus for forming articles possessing an aperture from sheet glass.

2. Description of Related Art

In the glass industry diamond tooling, i.e., diamond drill, is ordinarily employed in the cutting of holes or apertures in glass articles, usually in a post-formation or secondary process. Alternatively, after the glass article is formed it is reheated and a desired shaped hole is punched, again in a secondary process. These processes, however, are labor intensive and time consuming in addition to being costly, all which translate into increased costs with the end user.

Automated cutting or trimming techniques for glass, however, are known in the industry. U.S. Pat. Nos. 3,193,367 (Giffen), 3,528,791 (Giffen), 4,361,429 (Anderson et al.), and U.S. Pat. No. 4,605,429 (Rajnik) disclose trimming of articles formed from sheet glass during a hot-forming operation. The trimming methods disclosed therein are directed at separating a formed article from the excess hot glass cullet which surrounds the periphery of an article-forming mold. U.S. Pat. Nos. 3,193,367 (Giffen), 3,528,791 (Giffen) and U.S. Pat. No. 4,361,429 (Anderson et al.) disclose trimming the formed article by applying a shearing load to sever the surrounding glass. Whereas, U.S. Pat. No. 4,605,429 (Rajnik) discloses trimming the glass cullet by pressing a thin spot in the glass between a blunt edge trimmer and a flat surface in the mold.

None of these disclosures, however, teach the forming of regular and irregular holes or apertures in a newly formed glass article during the hot-forming process. Therefore, there exists the need for a simple, cost-effective apparatus and method for cutting or trimming glass to form regular and irregular shaped apertures in a newly formed glass article during conventional hot-glass molding and pressing process.

It is an object of the present invention to provide an apparatus and method for forming apertures in glass articles during the molding and pressing process and not in a post-formation operation.

It is also an object of the present invention to provide an apparatus and method for trimming regular and irregular apertures in glass articles that provides reliable trimming and pristine trimmed edges.

SUMMARY OF THE INVENTION

Briefly, the present invention provides for an apparatus for forming a glass article possessing an aperture formed from sheet glass, comprising a mold, a plunger being in cooperative alignment with the mold, wherein the mold and the plunger form a cavity exhibiting the shape of the desired glass article, an outer trimmer for separating the glass article from the surrounding excess sheet glass, and an inner trimmer for forming the aperture in the glass article.

Also provided herein is a method for forming a glass article possessing an aperture from molten glass sheet. In one embodiment, a single sheet of molten glass is delivered and deposited to the surface of a mold assembly having a mold groove formed therewithin so as to overlie the mold groove and the surrounding surface of the mold assembly. The sheet of molten glass is initially permitted to substantially conform to the contour of the mold groove, then the molded glass sheet is pressed within the mold groove into an article of desired upper and lower surface configuration. An aperture is formed in the article while the glass is still in a semi-molten condition and the glass within the mold groove is trimmed from the surface portions of the mold assembly, and the completed article is removed from the mold cavity.

In another embodiment a second sheet of molten glass is delivered and deposited on the contoured sheet prior to the pressing operation, wherein the second sheet of glass bridges but does not sag into contact with the contoured surface of the molded glass sheet. The second glass sheet hermetically seals to the first sheet wherever contact is made. Thereafter, the two sheets of glass are pressed into an article of desired upper and lower surface configuration. An aperture is formed in the article while the glass is still in a semi-molten condition, the article is then trimmed within the mold groove from the surface portions of the mold assembly, and the article is completely removed from the mold cavity.

The inventive apparatus and method eliminate a post-formation cutting or trimming operation, resulting in a simpler, more cost-efficient process.

BRIEF DESCRIPTION OF THE DRAWINGS

The invention will be further described in conjunction with the attached drawings in which.

Figure 1:
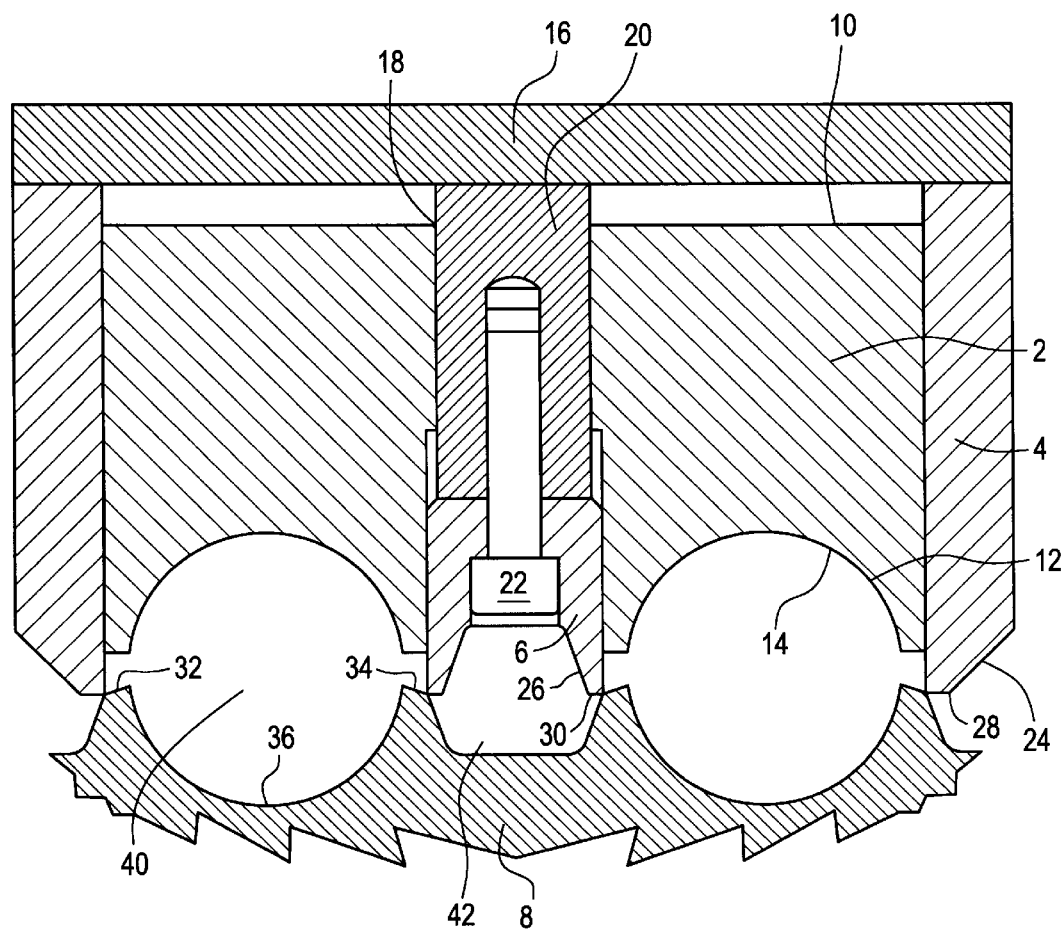
FIG. 1 is a cross-sectional elevational view of the inventive apparatus illustrating the plunger, outer trimmer and inner trimmer in cooperation with the mold assembly.

The accompanying drawings are included to provide a further understanding of the invention and are incorporated in and constitute a part of this specification, illustrate one embodiment of the invention and together with the description serve to explain the principles of the invention. In the drawings, like reference characters denote similar elements throughout the several views. It is to be understood that various elements of the drawings are not intended to be drawn to scale, but instead are sometimes purposely distorted for the purposes of illustrating the invention.

DETAILED DESCRIPTION OF THE PREFERRED EMBODIMENTS

In the present invention in one embodiment, a single sheet of molten glass is delivered and deposited to the surface of a mold assembly having a groove formed therewithin so as to overlie the mold groove and the surrounding surface of the mold assembly. The sheet of molten glass is initially permitted to substantially conform to the contour of the mold groove, then the molded glass sheet is pressed within the mold groove into an article of desired upper and lower surface configuration. Thereafter, an aperture is formed in the article while the glass is still in a semi-molten condition and the glass within the mold groove is trimmed from the surface portions of the mold assembly. The completed article is removed from the mold cavity. It should be noted that pressing is not always necessary, only when altering the thickness or shape of the sheet glass.

In most preferred embodiment a second sheet of molten glass is delivered and deposited on a contoured first glass sheet as described in U.S. Pat. No. 5,858,046 (Allen et al.), co-assigned to the instant assignee, and herein incorporated in its entirety.

FIG. 1 illustrates the present inventive apparatus for forming glass articles possessing an aperture from two sheets of molten glass. It should be noted, however, that the apparatus of FIG. 1 may be adapted to receive and form glass articles possessing an aperture from a single sheet of glass.

Specifically the apparatus comprises plunger 2, outer trimmer 4 and inner trimmer 6 in cooperative alignment with mold 8 for forming glass articles. The term "outer trimmer" as used herein refers to that component of the inventive apparatus which is engaged to separate the newly formed glass article from the surrounding excess glass sheet. The term "inner trimmer" as used herein refers to that component of the inventive apparatus which is engaged to form an aperture in the glass article.

Therefore, in the present inventive process there are in effect two trimming operations. To differentiate between these two trimming operations, the terms "inner trimming" and "outer trimming" will be employed. The term "inner trimming" as used herein refers to forming of regular and irregular apertures in a newly formed glass article during the hot-forming process. The term "outer trimming" as used herein refers to trimming of the newly formed glass article from the excess hot-glass cullet after the molding and pressing operations.

Plunger 2 has an upper portion 10 and a lower portion 12. Plunger lower portion 12 has a glass contacting surface 14. Outer trimmer 4 and inner trimmer 6 are connected to each other through mounting surface 16. Plunger 2 is adapted to receive inner trimmer 6 through plunger upper portion 10 at cavity 18.

Shown at 20 is inner trimmer guide. It is desirable for the inner trimmer to be relatively small in size to reduce machining costs. Inner trimmer guide 20 functions as a means of attachment to connect inner trimmer 6 to mounting surface 16, and as an alignment and guiding component which positions inner trimmer 6 relative to plunger 2 and mold 8. In the preferred embodiment inner trimmer guide 20 is made of cast iron and plunger 2 is made stainless steel. The use of different materials in the two components is employed to prevent "galling"; an art-known term which means chafing or abrasion resulting from two materials, especially similar ones, when rubbing against one another under high loads. Galling is more significant at elevated temperatures because of localized heating of the materials due to friction.

Shown at 22 is a fastener which functions as a means to locate and attach inner trimmer 6 to guide 20.

Outer trimmer 4 and inner trimmer 6 are connected to each other through mounting surface 16, and are mechanically independent of plunger 2. The outer and inner trimmers may be adjusted to sustain different heights via shims (not shown) or other art-known height adjusting mechanism at the attachment sites on mounting surface 16. In addition horizontal movement is allowed for in the trimming members tooling to accommodate differential thermal growth during the glass-article hot-forming process. Outer and inner trimmers 4 and 6 are beveled at 24 and 26 respectively, to form outer trimmer and inner trimmer cutting edges 28 and 30, respectively. During the forming process when sheet glass is loaded in the inventive apparatus, outer trimmer cutting edges 28 and inner trimmer cutting edges 30 operate to apply a load to the glass via a shearing action to sever the glass at the points of contact, as disclosed in U.S. Pat. No. 4,361,429 (Anderson et al.);

the teachings of which patent are herein incorporated by reference in their entirety. More specifically, outer trimmer cutting edges 28 are moved downwardly in cooperation with outer mold edges 32, and inner trimmer cutting edges 30 are moved downwardly in cooperation with inner mold edges 34. The glass is severed at the point where the load is applied.

Mold 8 possesses glass contacting surface 36. In FIG. 1 plunger 2, outer trimmer 4 and inner trimmer 6 are shown in position for forming a glass article in cooperation with mold 8, i.e., plunger glass contacting surface 14 and mold glass contacting surface 36 form a cavity 40 exhibiting the shape of the desired glass article.

Mold 8 further possesses cavity 42. After the aperture is formed by inner trimmer 6, the residual glass is cut-away from the article and pressed into cavity 42.

The shape of the aperture, may be regular, i.e., rectangular, round, or irregular; notwithstanding, the desired shaped aperture is determined by the configuration of inner trimmer 6 and corresponding mold shape.

Figure 2:
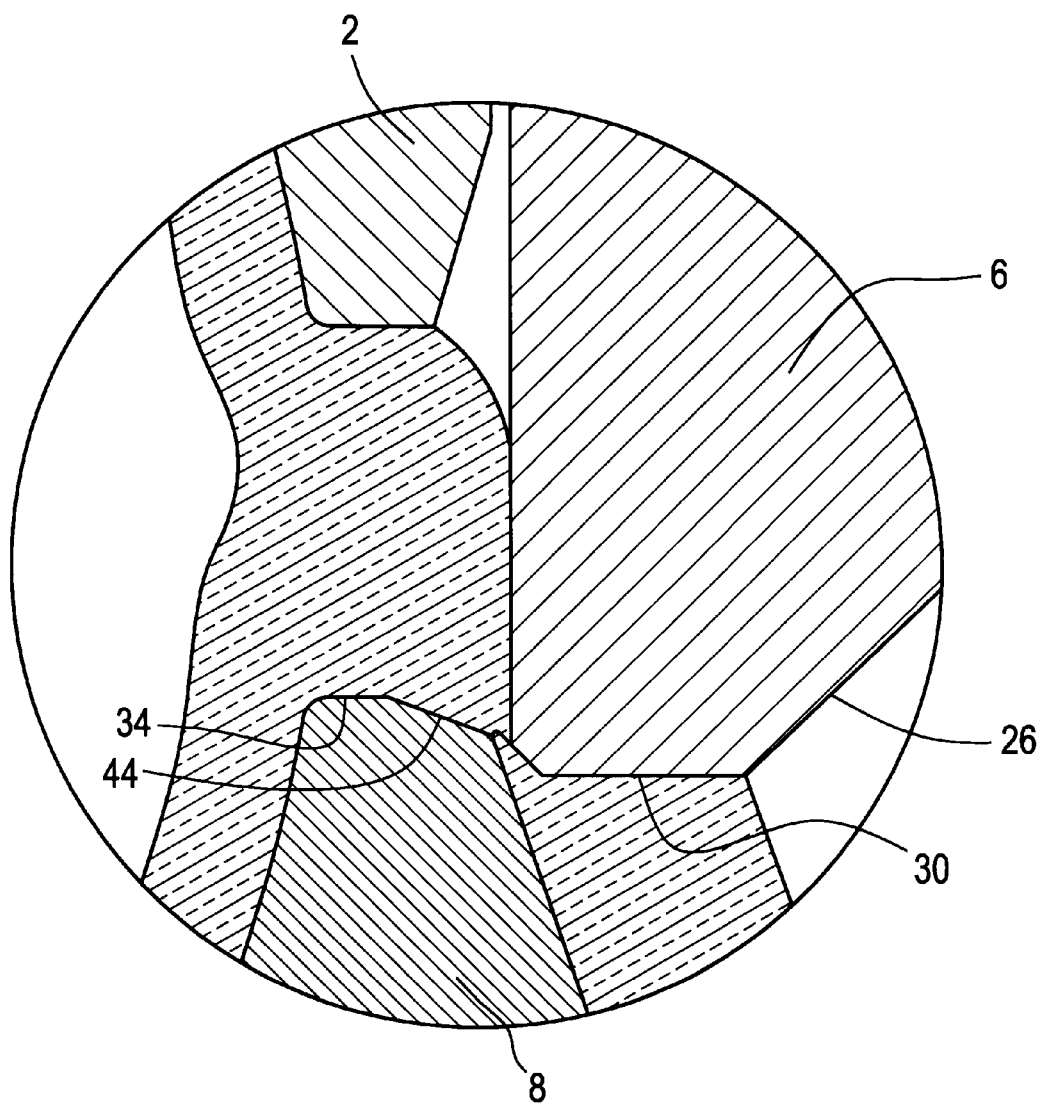
FIG. 2 is an enlarged cross-sectional view of the trimming operation at the inner trimmer.

As shown in FIG. 2, an incline or chamfer is machined in mold 8 at 44 to maintain the glass hot for effective trimming. As the sheet glass lays over the mold and sags slightly, the glass will not make intimate contact with the mold due to the mold surface being angled downward at the chamfer. This is well known in the art. Additionally, a "draw ring", i.e., a raised metal lip, may also be machined on the periphery of the mold to also prevent intimate contact of the glass with the mold surface.

A key feature of the present invention is that outer trimmer 4 and inner trimmer 6 are completely divorced mechanically and in process from plunger 2. It is contemplated, however, that inner trimmer 6 may be attached to plunger 2. In such an embodiment the forming of regular and irregular apertures in a glass article is linked to and defined by the movement and parameters of plunger 2. More specifically, the inner trimming operation occurs at the same time as the pressing operation. Whereas, in the preferred embodiment herein above described, the inner trimming operation occurs subsequent to the pressing operation and concurrently to the outer trimming operation.

Perfection of the trimming process is driven to a great degree by the dimensional tolerances between the cutting edges on the mold and cutting edges on the trimming members. These tolerances are refined empirically via tooling dimensions, mechanical mounting height and temperature control. Physical attachment of the inner trimming members to the plunger tooling not only precludes a separate process cycle, but also hinders the ability to alter vertical mounting height and temperature control during the trimming operation. Therefore, it was found that even though apertures can be formed in a glass article when the inner trimming members are attached to the plunger tooling, only marginal results are obtained, i.e., the process capability and product quality are reduced.

Therefore, in the preferred embodiment of the present inventive apparatus where inner trimming members are attached to outer trimming members, differential height adjustment and thermal control are more easily accomplished due to lack of contact with the plunger. Other advantages include reduced glass checking, better release of the glass, i.e., the glass shrinks less due to a shorter contact time with the inner trimming members, reduced trimming force and a more pristine internal trim edge and less bulging of the glass produced via lateral glass flow during trimming.

EXAMPLE

Figure 3:
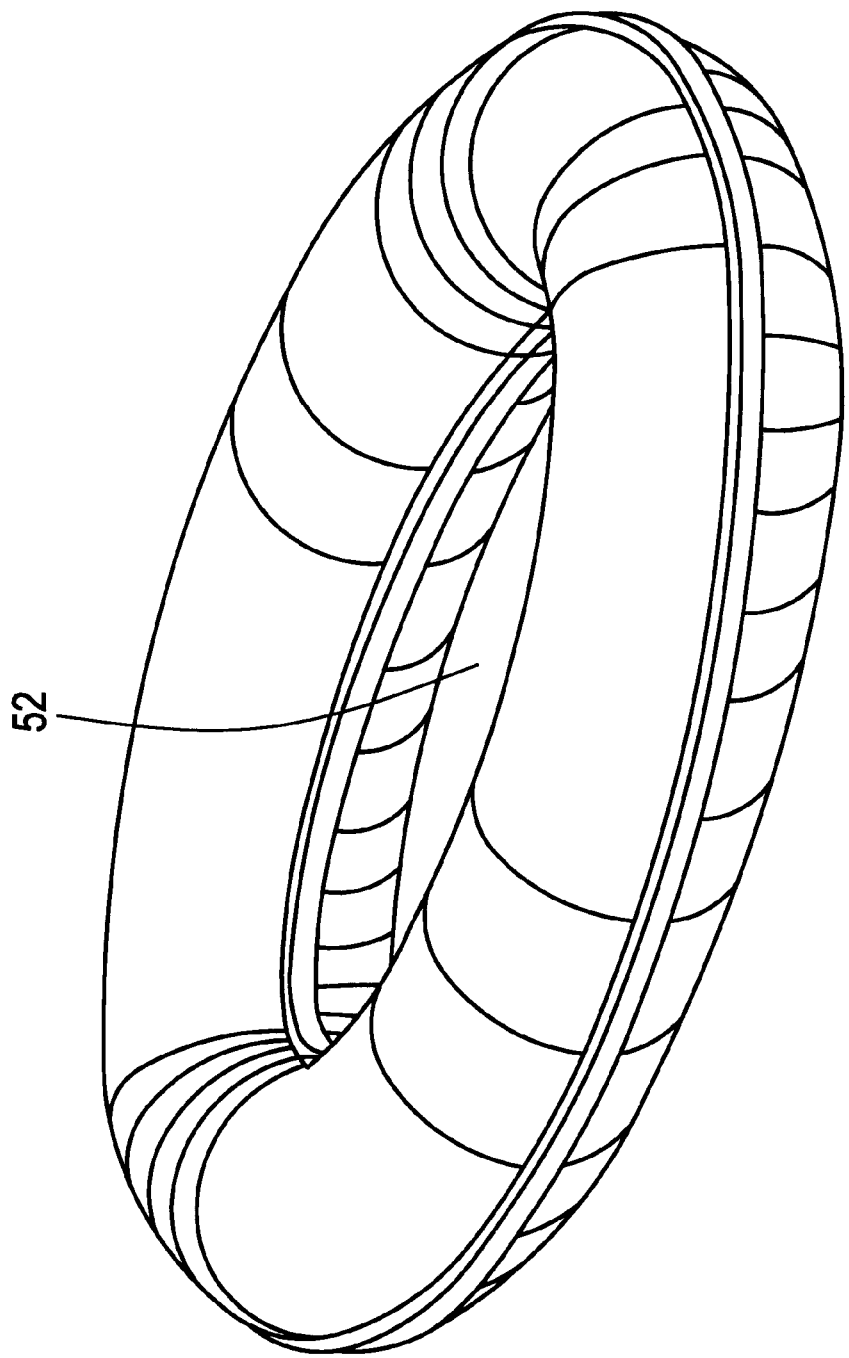
FIG. 3 is a perspective view of an embodiment of a glass article possessing an aperture capable of being produced utilizing the present inventive apparatus and method, the glass article being formed from two glass sheets.

The following nonlimiting example is presented to better illustrate the present invention. 15 The apparatus and method described above have been successfully utilized to produce a glass article of the shape as depicted in FIG. 3; a glass envelope 50 for a light emitting device. Glass envelope 50 possesses aperture 52 which is centrally located in the glass article.

Glass envelope 50 is symmetrically shaped and exhibits dimension of 14"×5". Aperture 52 exhibits dimensions of 10"×1".

Figure 4:
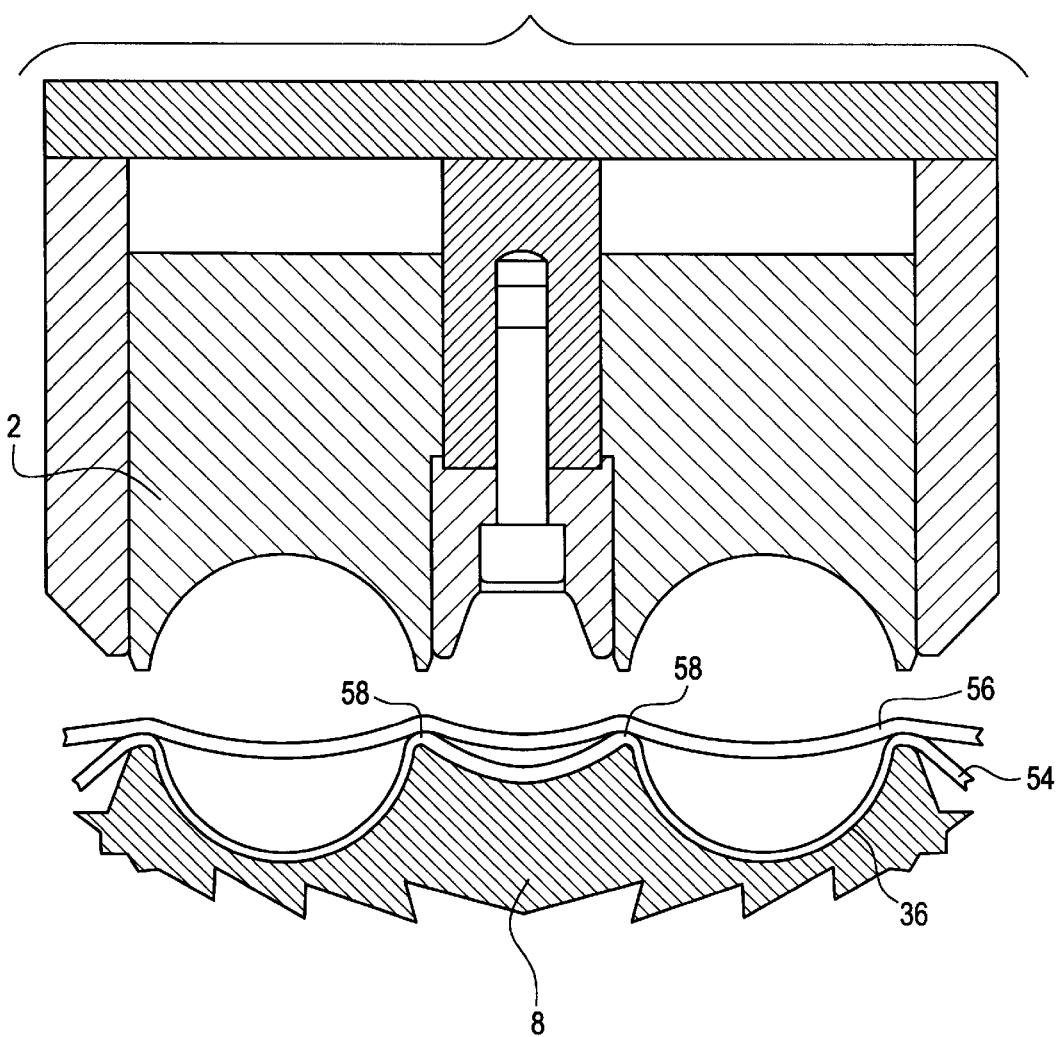
FIG. 4 is a cross-sectional view of the apparatus of FIG. 1 showing a first sheet of glass delivered, deposited and made to substantially conform to the cavity of the mold assembly, a second sheet deposited to the contoured first sheet prior to the pressing operation and the activation of the plunger.

A glass consisting essentially of, expressed in weight percent on the oxide basis, 77.4 wt. % $SiO_2$, 5.3 wt. % $Na_2O$, 15.4 wt. % $B_2O_3$, 1.9 wt. % $Al_2O_3$, 0.48 wt. % Cl was delivered and deposited as a first sheet of glass 54 to a mold 8 as depicted in FIG. 4. First sheet of glass 54 was made to conform to the mold groove 36 by drawing a vacuum. A second sheet of glass 56, possessing the same glass composition as given above, was deposited and delivered over the contoured first sheet of glass prior to the pressing operation. The second sheet 56 is delivered at a viscosity preferably in the range of 5,000–6,000 poises such that it hermetically sealed the first sheet 54 wherever contact 58 was made between the two sheets, but the second sheet 56 did not sag into the contours of first glass sheet 54.

Figure 5:
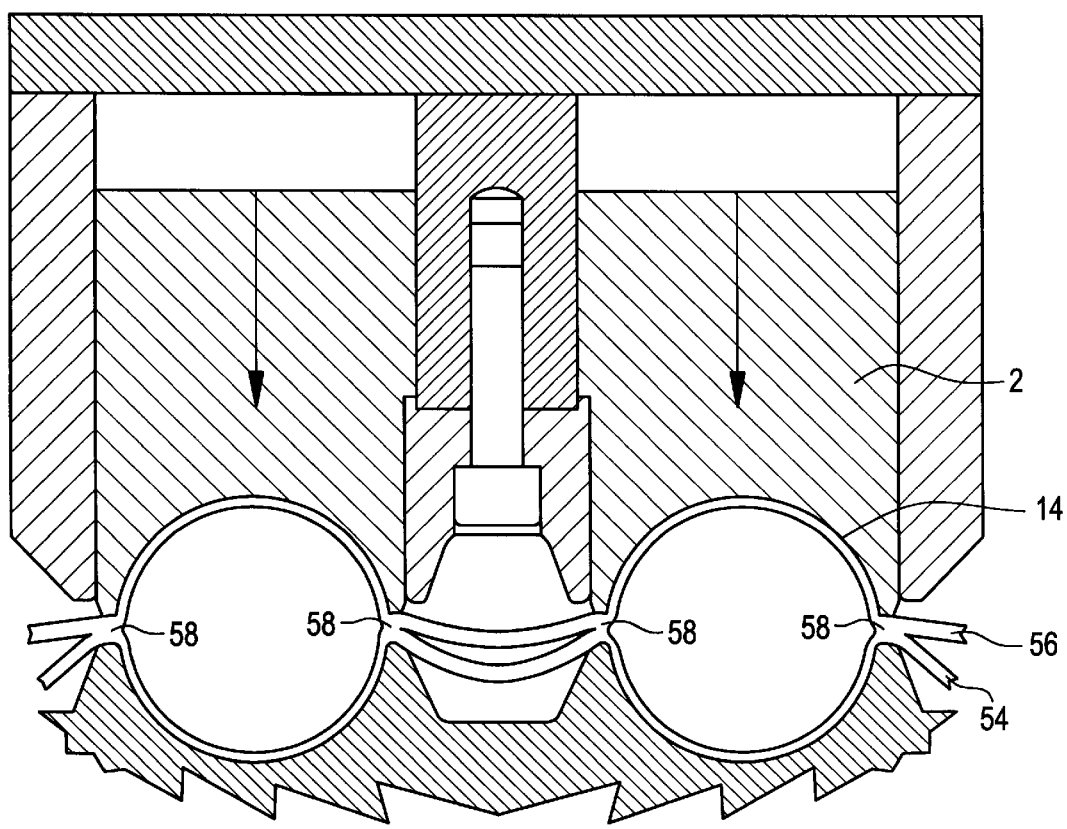
FIG. 5 illustrates the pressing operation of the apparatus and process of FIG. 1.

Referring now to FIG. 5, plunger 2 is brought into contact with second sheet 56, to press the two sheets of glass at contact points 58 to ensure a good glass-to-glass seal. Plunger 2 also applies a profile to second sheet 56. Second sheet 56 is made to substantially conform to the contour of plunger glass contacting surface 14 by way of conventional vacuum, whereby an article of desired upper and lower surface configuration is formed. Alternatively to vacuum, positive air may be blown into the glass envelope through open sites formed in the first sheet (not shown), to assist the second sheet to better conform to the groove of the plunger. The air is preferably introduced via an air line orifice which is connected to machined slots in the mold (not shown) in the mold and is in communication with open sites (not shown) in the first sheet.

Figure 6:
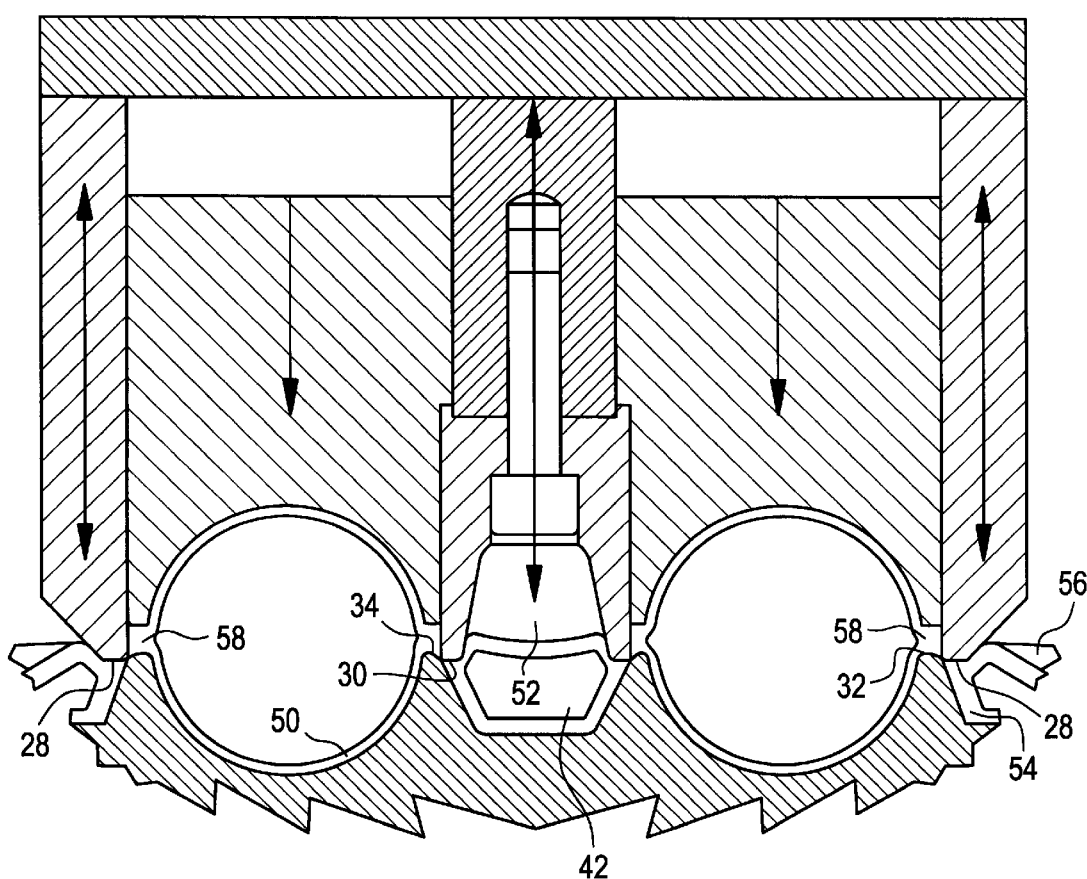
FIG. 6 illustrates the outer and inner trimming operations in the apparatus and process of FIG. 1.

The plunger is pressed into the molten glass under hydraulic force in the range of 50 to 250 psi per unit area of glass, and dwell times in the range of 1 to 4 seconds are preferred. 15 After the molding operation, the inner and outer trimming operations are activated. Outer trimmer cutting edges 28 are moved downwardly into cooperation with outer mold edges 32, as shown in FIG. 6 by the arrows. The glass is severed away at the points of contact, such that the newly formed symmetrically shaped glass article is separated from the surrounding excess hot glass. Concurrently, inner trimmer cutting edges 30 are moved downwardly into cooperation with inner mold edges 34 to form aperture 52. The excess glass trimmed away from glass article 50 to form aperture 52 is pressed away into cavity 42.

Reasons for forming aperture 52 are numerous and including for mounting the glass envelope as a lamp to a fixture, and for aesthetic reasons.

Glass envelope 50 is employable as a light emitting device when electrodes (not shown) are attached thereto and the envelope is filled with an ionizable gas, such as neon. The glass envelope may also be used for fluorescent applications.

Although there is herein shown and described only one specific form of apparatus embodying the invention, it will be understood by one skilled in the art that such is not to be considered in any way limiting but that various changes or modifications may be made therein within the purview of the appended claims without departing from the spirit and scope thereof.

What is claimed is:

1. An apparatus for forming a glass article having an inner aperture, said apparatus comprising:

a mold;

a plunger in cooperative alignment with said mold;

an outer trimming member surrounding said plunger;

an inner trimming member connected to said outer trimming member and being operable simultaneously with said outer trimming member in a vertical direction, said inner trimming member movable in said vertical direction within a cavity in said plunger;

said trimming members being independent in attachment from said plunger.

* * * * *